(12) United States Patent
Lee et al.

(10) Patent No.: US 12,197,061 B2
(45) Date of Patent: Jan. 14, 2025

(54) ELECTRONIC DEVICE

(71) Applicant: InnoLux Corporation, Miao-Li County (TW)

(72) Inventors: Wei-Cheng Lee, Miao-Li County (TW); I-An Yao, Miao-Li County (TW); Jiunn-Shyong Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/512,448

(22) Filed: Nov. 17, 2023

(65) Prior Publication Data
US 2024/0210749 A1    Jun. 27, 2024

(30) Foreign Application Priority Data

Dec. 23, 2022    (CN) .......................... 202211664959.6

(51) Int. Cl.
  *G02F 1/1335*  (2006.01)
  *G02F 1/1333*  (2006.01)
  *G02F 1/1347*  (2006.01)

(52) U.S. Cl.
  CPC .... *G02F 1/133502* (2013.01); *G02F 1/13478* (2021.01); *G02F 1/13338* (2013.01); *G02F 1/133616* (2021.01)

(58) Field of Classification Search
  CPC ........... G02F 1/133502; G02F 1/13478; G02F 1/13338; G02F 1/133616
  USPC ......................................... 349/137
  See application file for complete search history.

(56) References Cited

U.S. PATENT DOCUMENTS

| | | | |
|---|---|---|---|
| 9,612,388 B2 | 4/2017 | Chen et al. | |
| 2020/0172429 A1 | 6/2020 | Liu et al. | |
| 2020/0363571 A1* | 11/2020 | Isshiki | G02B 5/0294 |
| 2023/0244100 A1* | 8/2023 | Zhu | G02F 1/133504 |
| | | | 359/599 |

FOREIGN PATENT DOCUMENTS

| | | |
|---|---|---|
| CN | 107324649 A | 11/2017 |
| TW | 201544856 A | 12/2015 |

* cited by examiner

*Primary Examiner* — Charles S Chang
(74) *Attorney, Agent, or Firm* — McClure, Qualey & Rodack, LLP

(57) ABSTRACT

An electronic device is provided. The electronic device includes a panel and an optical element. The optical element is disposed on the panel. The optical element includes a first surface away from the panel. The first surface has a microstructure, and the microstructure has an arithmetical mean deviation of the profile (Ra). The optical element has a thickness. In addition, the arithmetical mean deviation of the profile (Ra) and the thickness conform to the following formula: 0.00001≤arithmetical mean deviation of the profile/thickness≤0.0104.

21 Claims, 9 Drawing Sheets

ELECTRONIC DEVICE

CROSS REFERENCE TO RELATED APPLICATIONS

This application claims the benefit of China Application No. 202211664959.6, filed Dec. 23, 2022, the entirety of which is incorporated by reference herein.

BACKGROUND

Technical Field

The present disclosure is related to an electronic device, and in particular it is related to an electronic device with an anti-glare optical element.

Description of the Related Art

Electronic devices (e.g., display panels) with high-resolution or energy-saving features (and with related optical elements matched with those high-resolution or energy-saving features) are in continuous development. However, these electronic devices and optical elements still do not meet expectations in all respects. For example, the anti-glare effect of most optical elements is poor, which affects the display quality. Therefore, developing a structural design that can improve the performance or quality of optical elements is still one of the current research topics in the industry.

SUMMARY

In accordance with some embodiments of the present disclosure, an electronic device is provided. The electronic device includes a panel and an optical element. The optical element is disposed on the panel. The optical element includes a first surface away from the panel. The first surface has a microstructure, and the microstructure has an arithmetical mean deviation of the profile (Ra). The optical element has a thickness. In addition, the arithmetical mean deviation of the profile (Ra) and the thickness conform to the following formula: $0.00001 \leq$ arithmetical mean deviation of the profile/thickness $\leq 0.0104$.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
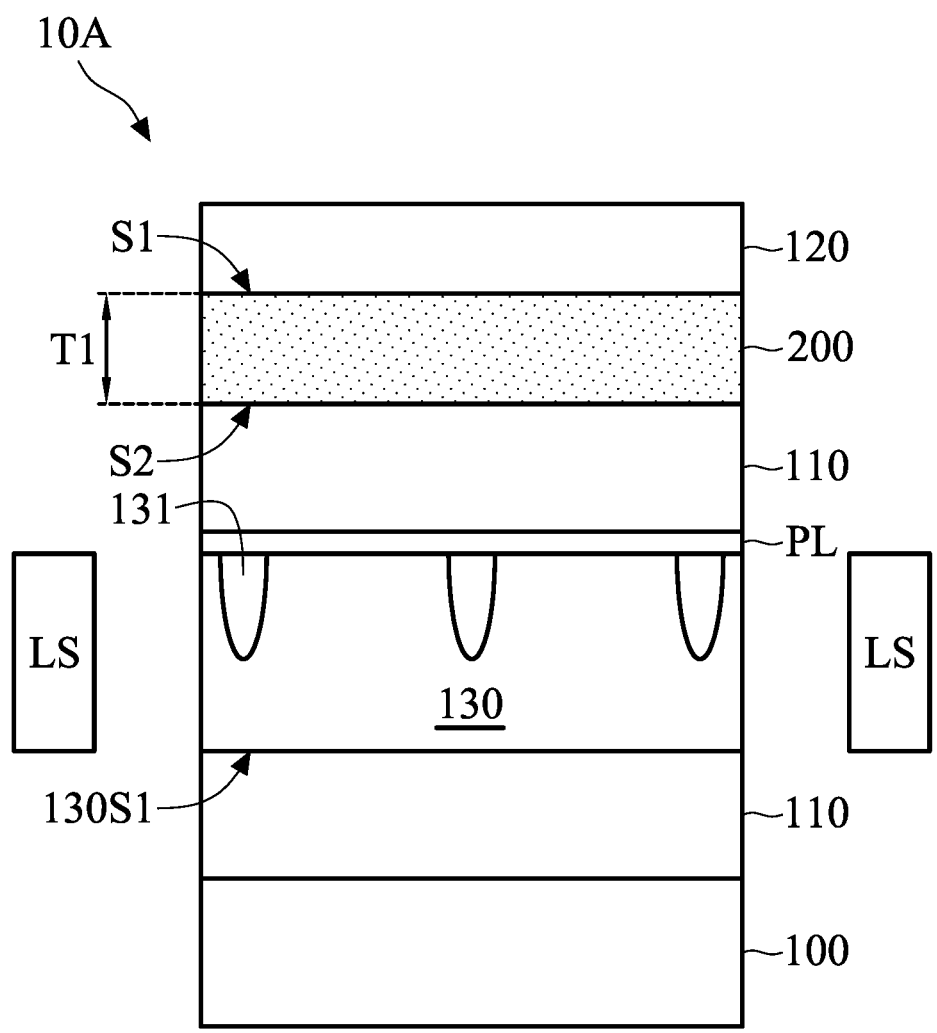
FIG. 1 is a cross-sectional diagram of an electronic device in accordance with some embodiments of the present disclosure.

The following disclosure provides several different embodiments or examples for implementing different elements in the provided display device. Specific examples of each element and its configuration are described below to simplify the embodiments of the present disclosure. Of course, these embodiments are merely examples, not intended to limit the present disclosure. For example, if the description mentions that a first element is formed on a second element, it may include an embodiment in which the first element and second element are in direct contact, and may also include an embodiment in which an additional element formed between the first element and second element, so that they are not in direct contact. In addition, the embodiments of the present disclosure may repeat element numerals and/or characters in different examples. This repetition is for brevity and clarity and is not intended to represent any correlation between the different embodiments and/or aspects discussed.

The directional terms mentioned herein, such as "up", "down", "front", "rear", "left", "right", etc., are only referring to the directions of the accompanying drawings. Accordingly, the directional terms used are for illustration, not for limitation of the present disclosure.

In accordance with the embodiments of the present disclosure, regarding the terms such as "connected to", "interconnected with", etc. referring to bonding and connection, unless specifically defined, these terms mean that two structures are in direct contact or two structures are not in direct contact, and other structures are provided to be disposed between the two structures. The terms for bonding and connecting may also include the case where both structures are movable or both structures are fixed. In addition, the term "electrically connected to" or "coupled to" may include any direct or indirect electrical connection means.

The ordinal numbers used in the specification and claims, such as the terms "first", "second", etc., are used to modify an element, which itself does not mean and represent that the element (or elements) has any previous ordinal number, and does not mean the order of a certain element and another element, or the order in the manufacturing method. The use of these ordinal numbers is to make an element with a certain name can be clearly distinguished from another element with the same name. Claims and the specification may not use the same terms. For example, the first element in the specification may refer to the second element in the claims. The terms "about", "equal to", "equivalent to", "the same as", "identical to", "substantially" or "essentially" typically mean +/−20% of the stated value, or typically +/−10% of the stated value, or typically +/−5% of the stated value, or typically +/−3% of the stated value, or typically +/−2% of the stated value, or typically +/−1% of the stated value or typically +/−0.5% of the stated value.

Moreover, certain errors may exist between any two values or directions used for comparison. If the first value is equal to the second value, it implies that there may be an error of about 10% between the first value and the second value; if the first direction is "substantially" perpendicular to the second direction, the angle between the first direction and the second direction may be between 80 degrees and 100 degrees; if the first direction is "substantially" parallel to the second direction, the angle between the first direction and the second direction may be between 0 degrees and 10 degrees.

Some variations of the embodiments are described below. In the different drawings and described embodiments, like reference numerals are used to designate like elements. It can be understood that additional operations may be provided before, during and after the method, and some described operations may be replaced or omitted in the method of some other embodiments.

In the embodiments of the present disclosure, the electronic device may include a display device, a backlight device, an antenna device, a sensing device, or a tiled device, but it is not limited thereto. The electronic device may be a bendable or flexible electronic device. The display device may be a non-self-luminous display device or a self-luminous display device. The antenna device may be a liquid-crystal type antenna device or a non-liquid crystal type antenna device. The sensing device may be a sensing device for sensing capacitance, light, heat or ultrasonic, but it is not limited thereto. The electronic device may include electronic components, and the electronic components may include passive components and active components, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs) or quantum dot light-emitting diodes (quantum dot LEDs), but they are not limited thereto. The tiled device may be, for example, a tiled display device or a tiled antenna device, but it is not limited thereto. It should be understood that the electronic device may be any permutation and combination of the foregoing. In the following description, the display device is used as an electronic device or a tiled device to illustrate the content of the present disclosure, but the present disclosure is not limited thereto.

In addition, the shape of the electronic device may be rectangular, circular, polygonal, with curved edges, or other suitable shapes. The electronic device may have peripheral systems such as a processing system, a driving system, a control system, a light source system, and a shelf system to support the display device or the tiled device.

It should be noted that the electronic device may be arranged in any combination as mentioned above, but it is not limited thereto. It should be understood that, without departing from the spirit of the present disclosure, the features in several different embodiments can be replaced, recombined, and mixed to complete another embodiment. The features between the various embodiments can be mixed and matched arbitrarily as long as they do not violate or conflict the spirit of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with the embodiments of the present disclosure, an electronic device is provided. The electronic device includes an optical element with a microstructure, and the microstructure has specific structural properties, thereby improving the anti-glare effect of the optical element. Therefore, the white fog problem of the displayed image can be effectively reduced or the clarity of the displayed image can be improved.

In accordance with the embodiments of the present disclosure, the electronic device may include a display device, a tiled device, a touch electronic device, a sensing electronic device, a curved electronic device or a non-rectangular electronic device, but it is not limited thereto. The electronic device may include, for example, liquid crystal, light-emitting diode, fluorescence, phosphor, other suitable display media, or a combination thereof, but it is not limited thereto. The display device may be a non-self-luminous display device or a self-luminous display device. The electronic device may include electronic components, and the electronic components may include passive components and active components, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs) or quantum dot light-emitting diodes (quantum dot LEDs), but they are not limited thereto. The tiled device may be, for example, a tiled display device, but it is not limited thereto. It should be understood that the electronic device may be any permutation and combination of the foregoing. Moreover, the electronic device may be a bendable or flexible electronic device. In addition, the shape of the electronic device may be rectangular, circular, polygonal, with curved edges, or other suitable shapes. The electronic device may have peripheral systems such as a processing system, a driving system, a control system, a light source system, and a shelf system to support the display device or the tiled device. For the convenience of description, the electronic device will be described below as a display device, but the present disclosure is not limited thereto.

Please refer to FIG. 1, which is a cross-sectional diagram of an electronic device 10A in accordance with some embodiments of the present disclosure. It should be understood that, for clarity, some elements of the electronic device 10A may be omitted in the drawings, and only some elements are schematically shown. In accordance with some embodiments, additional features may be added to the electronic device 10A described below.

As shown in FIG. 1, in accordance with some embodiments, the electronic device 10A includes a panel 100, an adhesive layer 110, a light guide plate 130, an optical element 200 and an anti-reflection layer 120. The optical element 200 may be disposed on the panel 100. The light guide plate 130 may be disposed between the optical element 200 and the panel 100. The adhesive layer 110 may be disposed between the panel 100 and the light guide plate 130 and/or between the optical element 200 and the light guide plate 130. The anti-reflection layer 120 may be disposed on the optical element 200. Furthermore, the electronic device 10A may include a light source LS, and the light source LS may be disposed adjacent to at least one side of the light guide plate 130. In accordance with some embodiments, the light source LS may be disposed on both sides of the light guide plate 130, but it is not limited thereto.

In accordance with some embodiments, the electronic device 10A may optionally omit the aforementioned light guide plate 130 and/or the light source LS. In accordance with other embodiments, the electronic device 10A may optionally omit the aforementioned anti-reflection layer 120.

The panel 100 may include a panel with anti-glare requirements. In accordance with some embodiments, the panel 100 includes a reflective panel, such as a reflective liquid-crystal display panel, an electrophoretic electronic ink panel, or another suitable reflective panel. The liquid-crystal panel may include a cholesteric liquid-crystal panel, or a display panel of another suitable liquid-crystal material, but it is not limited thereto. In accordance with some embodiments, the panel 100 includes an upper substrate (not illustrated), a lower substrate (not illustrated), an electrode layer (not illustrated), a display medium layer (not illustrated, such as a liquid-crystal layer), a spacer element (not illustrated), a color filter layer (not illustrated), etc., but it is not limited thereto. According to actual needs, the panel 100 may also optionally include an alignment layer (not illustrated), a polarizer (not illustrated), a light-shielding layer (not illustrated) and/or another functional optical film layer (not illustrated) or a driving element (not illustrated), etc., but it is not limited thereto.

The adhesive layer 110 can be used to fix adjacent components. The panel 100 and the light guide plate 130 may be fixed through the adhesive layer 110. The light guide plate 130 and the optical element 200 may be fixed through the adhesive layer 110. In accordance with some embodiments, the adhesive layer 110 may include a light-curable adhesive material, a heat-curable adhesive material, a light-heat-curable adhesive material, another suitable adhesive material, or a combination thereof, but it is not limited thereto. For example, the adhesive layer 110 may include optical clear adhesive (OCA), optical clear resin (OCR), pressure sensitive adhesive (PSA), another suitable material, or a combination thereof, but it is not limited thereto. In accordance with some embodiments, the adhesive layer 110 may include, for example, a full-surface adhesive layer or a patterned adhesive layer (such as air bonding, a grid-patterned adhesive, or a patterned adhesive of other shapes).

In accordance with some embodiments, the light guide plate 130 may be a front light guide plate. The light guide plate 130 may have a single-layer or multi-layer structure. In accordance with some embodiments, the light guide plate 130 may include a dot structure 131, and the dot structure 131 may be disposed on a side of the light guide plate 130 that is adjacent to the optical element 200. The dot structure 131 may include, for example, a reflective material, such as white dots, but it is not limited thereto. The density of the dot structure 131 in different regions or the appearance of the dot structure 131 can be adjusted according to actual needs. In accordance with some embodiments, the material of the light guide plate 130 may include glass, polymethylmethacrylate (PMMA), cycloolefin polymer (COP), polycarbonate (PC), another suitable material, or a combination thereof, but it is not limited thereto. In accordance with some embodiments, a protective layer PL may be disposed on a side of the light guide plate 130 that is adjacent to the dot structure 131. In accordance with some embodiments, the protective layer PL may be disposed between the light guide plate 130 and the adhesive layer 110. For example, the protective layer PL can be used to protect the dot structure 131 from damage.

In accordance with some embodiments, the light guide plate 130 can guide most of the light emitted by the light source LS to the surface 130S1 that is adjacent to the panel 100. When the electronic device 10A is placed in a dark environment, light can be emitted by turning on the light source LS, and the light can be guided to the panel 100 through the light guide plate 130, thereby providing enough light to the panel 100 (e.g., a reflective panel) to improve the brightness of the displayed image.

In accordance with some embodiments, the light source LS may include an inorganic light-emitting diode, an organic light-emitting diode, electroluminescence, another suitable light-emitting element, or a combination thereof, but it is not limited thereto. Furthermore, the inorganic light-emitting diode may include, for example, a light-emitting diode (LED), a mini light-emitting diodes (mini LED), a micro light-emitting diode (micro LED), a quantum dot light-emitting diode (QLED, QD-LED), another suitable light-emitting element, or a combination thereof, but it is not limited thereto.

Furthermore, the optical element 200 includes a first surface S1 away from the panel 100 and a second surface S2 adjacent to the panel 100, and the first surface S1 is opposite to the second surface S2. In accordance with some embodiments, the first surface S1 has a microstructure. In other words, the surface of the optical element 200 away from the panel 100 has a microstructure. In accordance with some embodiments, the material of the optical element 200 may include light-transmitting materials, such as glass, polymethylmethacrylate (PMMA), polycarbonate (PC), polyethylene terephthalate (PET), another suitable material or a combination thereof, but it is not limited thereto. In accordance with some embodiments, an etching process or a laser engraving process may be performed on the first surface S1 of the optical element 200 to form microstructures. The above methods are merely examples, but the present disclosure is not limited thereto. In accordance with some embodiments, the second surface S2 of the optical element 200 is not processed by an etching process or a lithography process.

Specifically, the microstructure of the optical element 200 has an arithmetical mean deviation of the profile (Ra). The optical element 200 has a thickness T1. In addition, the arithmetical mean deviation of the profile Ra and the thickness T1 conform to the following formula: $0.00001 \leq$ arithmetical mean deviation of the profile/thickness$\leq 0.0104$, but it is not limited thereto. In accordance with some embodiments, the arithmetical mean deviation of the profile Ra and the thickness T1 of the optical element 200 conform to the following formula: $0.00005 \leq$ arithmetical mean deviation of the profile/thickness$\leq 0.0004$, but it is not limited thereto. In accordance with some embodiments, the arithmetical mean deviation of the profile Ra and the thickness T1 of the optical element 200 conform to the following formula: $0.0001 \leq$ arithmetical mean deviation of the profile/thickness$\leq 0.0003$, but it is not limited thereto. For example, the thickness T1 of the optical element 200 may be an average value obtained by measuring any three points of the optical element 200 in a cross-section.

In accordance with some embodiments, the arithmetical mean deviation of the profile of the microstructure may be between 0.1 micrometers (μm) and 0.22 micrometers (that is, 0.1 μm$\leq$the arithmetical mean deviation of the profile$\leq 0.22$ μm), or between 0.1 μm and 0.2 μm (i.e. 0.1 μm$\leq$thickness T1$\leq 0.22$ μm), but it is not limited thereto. In accordance with some embodiments, the thickness T1 of the optical element 200 may be between 21 micrometers (μm) and 10000 micrometers (i.e. 21 μm$\leq$thickness T1$\leq 10000$ μm), or between 50 μm and 9000 μm (i.e. 50 μm$\leq$thickness T1$\leq 9000$ μm), or between 100 μm and 8000 μm (i.e. 100 μm$\leq$thickness T1$\leq 8000$ μm), or between 500 μm and 7000 μm (i.e. 500 μm$\leq$thickness T1$\leq 7000$ μm), or between 500 μm and 2000 μm (i.e. 500 μm$\leq$thickness T1$\leq 2000$ μm), but it is not limited thereto.

In accordance with some embodiments, the first surface S1 of the optical element 200 can be measured by a surface roughness measuring instrument or another instrument with the same function, so as to obtain the arithmetical mean deviation of the profile Ra of the microstructure.

It should be understood that, in accordance with the embodiments of the present disclosure, an optical microscope (OM), a scanning electron microscope (SEM), a film thickness profiler (α-step), an ellipsometer or another suitable method can be used to measure the thickness, width, or height of an element, or the distance between elements. Specifically, in accordance with some embodiments, a scanning electron microscope can be used to obtain a cross-sectional image including the element to be measured, and the thickness, width, or height of an element, or the distance between elements in the image can be measured.

Figure 2:
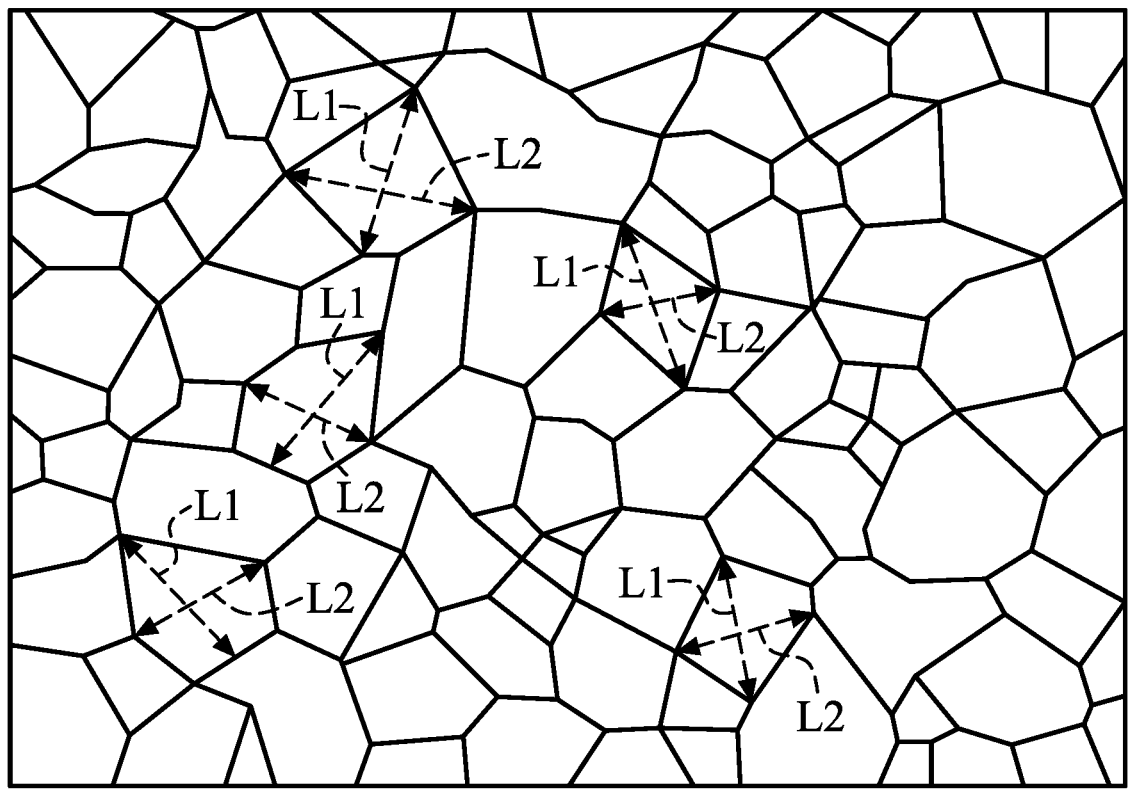
FIG. 2 is a top-view diagram of a microstructure of an optical element in accordance with some embodiments of the present disclosure.

In addition, on a plane parallel to the first surface S1 (for example, the X-Y plane in the drawing), the microstructure of the optical element 200 has a width (not labeled, the width can be defined with reference to FIG. 2), and the width and the thickness T1 conform to the following formula: $0.001 \leq \text{width/thickness} \leq 0.3$, but it is not limited thereto. In accordance with some embodiments, the width of the microstructure of the optical element 200 and thickness T1 conform to the following formula: $0.005 \leq \text{width/thickness} \leq 0.15$, but it is not limited thereto. In accordance with some embodiments, the width and thickness T1 of the microstructure of the optical element 200 conform to the following formula: $0.0075 \leq \text{width/thickness} \leq 0.12$, but it is not limited thereto. In accordance with some embodiments, the width and thickness T1 of the microstructure of the optical element 200 conform to the following formula: $0.008 \leq \text{width/thickness} \leq 0.1$, but it is not limited thereto. In accordance with some embodiments, the width and thickness T1 of the microstructure of the optical element 200 conform to the following formula: $0.01 \leq \text{width/thickness} \leq 0.09$, but it is not limited thereto.

In accordance with some embodiments, the width of the microstructure may be between 15 micrometers (μm) and 50 micrometers (i.e. 15 μm ≤ width ≤ 50 μm), or between 20 μm and 45 μm, for example, 25 μm, 30 μm, 35 μm or 40 μm, but it is not limited thereto.

The width of the microstructure of the optical element 200 refers to the grain size of the microstructure on the first surface S1. Specifically, please refer to FIG. 2, which is a top-view diagram of the microstructure of an optical element 200 in accordance with some embodiments of the present disclosure. The microstructure may, for example, be polygonal or irregular in shape, but it is not limited thereto. The width of the microstructure may be an average value of any five grain sizes of the microstructure in the X-Y plane (i.e., the direction of the top view), for example, the average value of the widths L1 and widths L2 of any five granular structures in the drawing. That is, the widths L1 of the five microstructures and the widths L2 of the five microstructures are added up and divided by 10. It should be noted that the width L1 of the microstructure is, for example, the maximum width of the microstructure, and the width L2 is, for example, a width substantially perpendicular to the width L1.

In addition, the first surface S1 of the optical element 200 has a first glossiness, and the second surface S2 has a second glossiness. In accordance with some embodiments, the second glossiness is greater than the first glossiness, which can reduce the risk of air bubbles generated when the second surface S2 is attached to the adhesive layer 110, thereby affecting the optical performance of the optical element 200 or the light guide plate 130. In accordance with some embodiments, the first glossiness and the second glossiness conform to the following formula: $0.15 \leq \text{first glossiness/second glossiness} \leq 0.95$, but it is not limited thereto. In accordance with some embodiments, the first glossiness of the first surface S1 and the second glossiness of the second surface S2 conform to the following formula: $0.2 \leq \text{first glossiness/second glossiness} \leq 0.9$, but it is not limited thereto. In accordance with some embodiments, the first glossiness of the first surface S1 and the second glossiness of the second surface S2 conform to the following formula: $0.35 \leq \text{first glossiness/second glossiness} \leq 0.79$, but it is not limited thereto. In accordance with some embodiments, the first glossiness of the first surface S1 and the second glossiness of the second surface S2 conform to the following formula: $0.4 \leq \text{first glossiness/second glossiness} \leq 0.6$, but it is not limited thereto. In accordance with some embodiments, the first glossiness of the first surface S1 and the second glossiness of the second surface S2 conform to the following formula: $0.45 \leq \text{first glossiness/second glossiness} \leq 0.55$, but it is not limited thereto.

In accordance with some embodiments, the first glossiness of the first surface S1 may be between 50 GU (gloss unit) and 110 GU (i.e. 50 GU ≤ first glossiness ≤ 110 GU), or between 60 GU and 100 GU (i.e. 60 GU ≤ first glossiness ≤ 110 GU), for example, 70 GU, 80 GU or 90 GU, but it is not limited thereto. In accordance with some embodiments, the second glossiness of the second surface S2 may be between 110 GU and 150 GU (i.e. 110 GU ≤ second glossiness ≤ 150 GU), for example, 120 GU, 130 GU or 140 GU, but it is not limited thereto.

In accordance with some embodiments, the first surface S1 and the second surface S2 of the optical element 200 can be measured by a gloss meter (such as a 60-degree gloss meter) or another instrument with the same function to obtain the first gloss degree and second gloss.

It should be noted that, in accordance with the embodiments of the present disclosure, when the arithmetical mean deviation of the profile Ra and thickness T1 of the microstructure of the optical element 200 conform to a specific formula, the width and thickness T1 of the microstructure of the optical element 200 conform to a specific formula, and the glossiness of the first surface S1 and the second surface S2 of the optical element 200 conform to a specific formula, the anti-glare effect of the optical element 200 can be improved. The white fog of the displayed image can be reduced or the clarity of the displayed image can be improved.

In accordance with some embodiments, the anti-reflection layer 120 can reduce the problem that ambient light is directly reflected and affects image clarity. The anti-reflection layer 120 may be formed on the first surface S1 of the optical element 200. In accordance with some embodiments, the anti-reflection layer 120 may be a multi-layer structure formed by alternately disposing high-refractive-index materials and low-refractive-index materials, but it is not limited thereto. In accordance with some embodiments, the high-refractive-index material may include silver (Ag), aluminum (Al), titanium (Ti), titanium dioxide ($TiO_2$), niobium-doped titanium oxide (TNO), zinc oxide (ZnO), zirconium dioxide ($ZrO_2$), another suitable high-refractive-index material or a combination thereof, but it is not limited thereto. In accordance with some embodiments, the low-refractive-index material may include silicon dioxide ($SiO_2$), magnesium fluoride ($MgF_2$), silicon nitride (SiN), another suitable low-refractive-index material, or a combination thereof, but it is not limited thereto. In accordance with some embodiments, a functional layer having an anti-fouling function may be optionally disposed on the anti-reflection layer 120.

Figure 3:
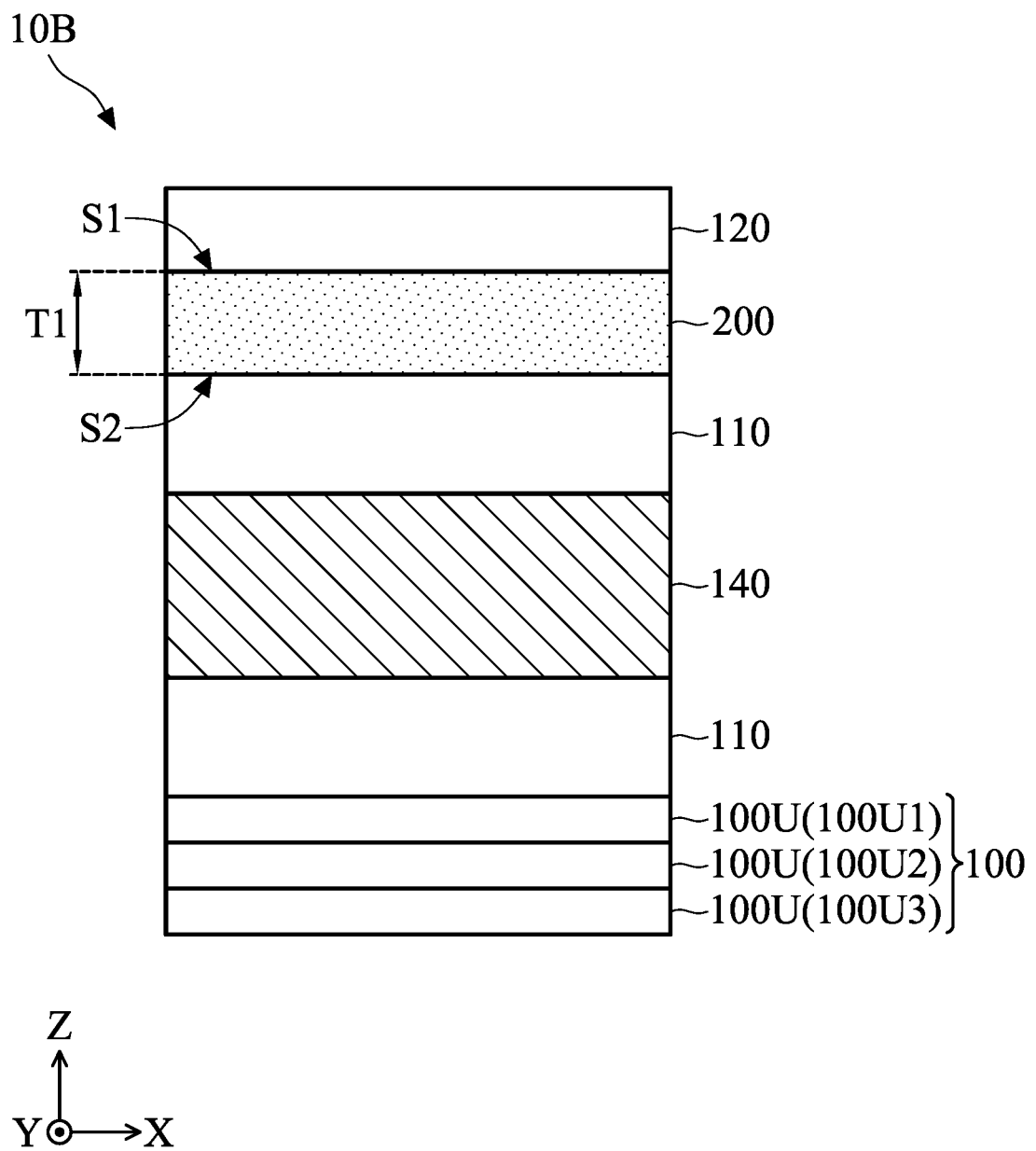
FIGS. 3-9 are cross-sectional diagrams of an electronic device in accordance with some embodiments of the present disclosure.

Next, please refer to FIG. 3, which is a cross-sectional diagram of an electronic device 10B in accordance with some other embodiments of the present disclosure. For clarity, some elements of the electronic device 10B may be omitted in the drawings, and only some elements are schematically shown. In accordance with some embodiments, additional features may be added to the electronic device 10B described below. In addition, it should be understood that the same or similar components or elements in the following context will be denoted by the same or similar reference numbers, and their materials, manufacturing methods and functions are the same or similar to those described above, and thus they will not be repeated in the following context.

As shown in FIG. 3, the electronic device 10B may further include a touch element 140, and the touch element 140 may be disposed between the optical element 200 and the panel 100. The adhesive layer 110 may be disposed between the touch element 140 and the optical element 200. The adhesive layer 110 may be disposed between the touch element 140 and the panel 100. The electronic device 10B may not have the light guide plate 130 and the light source LS. In accordance with some other embodiments, the touch element 140 may be an embedded touch element, such as an on-cell touch element integrated on the panel or an in-cell touch element integrated in the panel, Therefore, the adhesive layer 110 disposed between the touch element 140 and the panel 100 can be omitted.

In accordance with some embodiments, the touch element 140 may include a touch glass, a touch film or another element with touch function, but it is not limited thereto. In accordance with some embodiments, the touch element 140 may include a touch electrode and the wire electrically connected thereto. In accordance with some embodiments, the materials of the touch electrode and the wire may include a metal material or a transparent conductive material. The transparent conductive material may include, for example, indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), another suitable transparent conductive material or a combination thereof, but it is not limited thereto. In accordance with some embodiments, the touch element 140 may include a capacitive or resistive touch element.

In this embodiment, the panel 100 may include a plurality of panel units 100U, such as a panel unit 100U1, a panel unit 100U2, and a panel unit 100U3. The panel units 100U1, 100U2, and 100U3 may include cholesteric liquid-crystal layers that reflect light of different colors. For example, the panel unit 100U1 may include a blue cholesteric liquid-crystal unit, the panel unit 100U2 may include a green cholesteric liquid-crystal unit, and the panel unit 100U3 may include a red cholesteric liquid-crystal unit, but they are not limited thereto. In accordance with some embodiments, the number of panel units included in the panel 100 can be adjusted according to needs. In accordance with some embodiments, the color reflected by the cholesteric liquid-crystal unit can be adjusted according to needs.

In accordance with some embodiments, the electronic device 10B may optionally omit the aforementioned anti-reflection layer 120.

Figure 4:
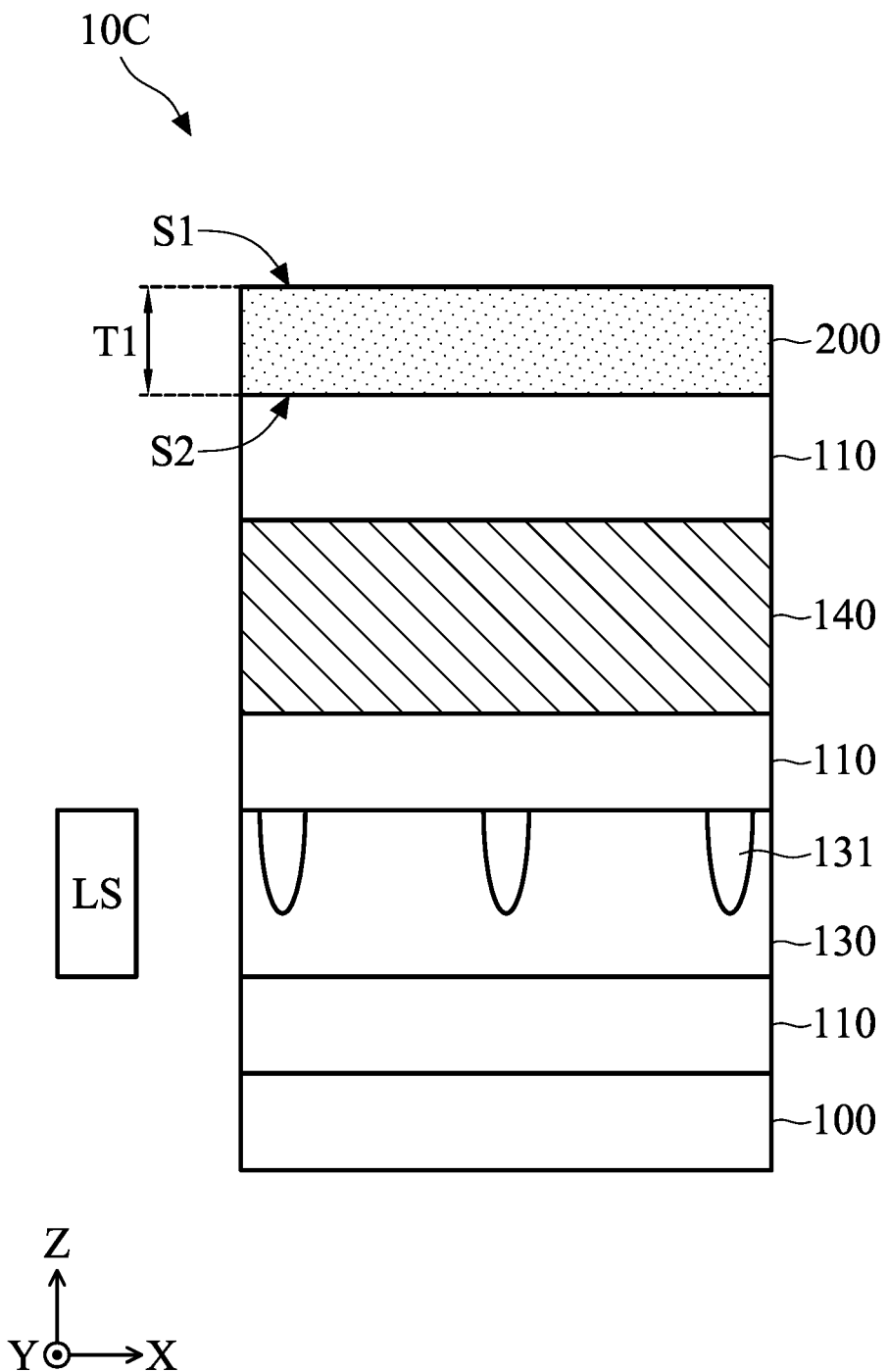

Next, please refer to FIG. 4, which is a cross-sectional diagram of an electronic device 10C in accordance with some other embodiments of the present disclosure. For clarity, some elements of the electronic device 10C may be omitted in the drawings, and only some elements are schematically shown. In accordance with some embodiments, additional features may be added to the electronic device 10C described below.

As shown in FIG. 4, the electronic device 10C may include a panel 100, an adhesive layer 110, a light guide plate 130, an adhesive layer 110, a touch element 140, an adhesive layer 110, and an optical element 200 disposed in sequence, but it is not limited thereto. The electronic device 10C may also include a light source LS disposed adjacent to the light guide plate 130. In this embodiment, the touch element 140 may be disposed between the optical element 200 and the light guide plate 130, and the adhesive layer 110 may be disposed between the touch element 140 and the optical element 200, between the touch element 140 and the light guide plate 130 and/or between the light guide plate 130 and the panel 100.

Figure 5:
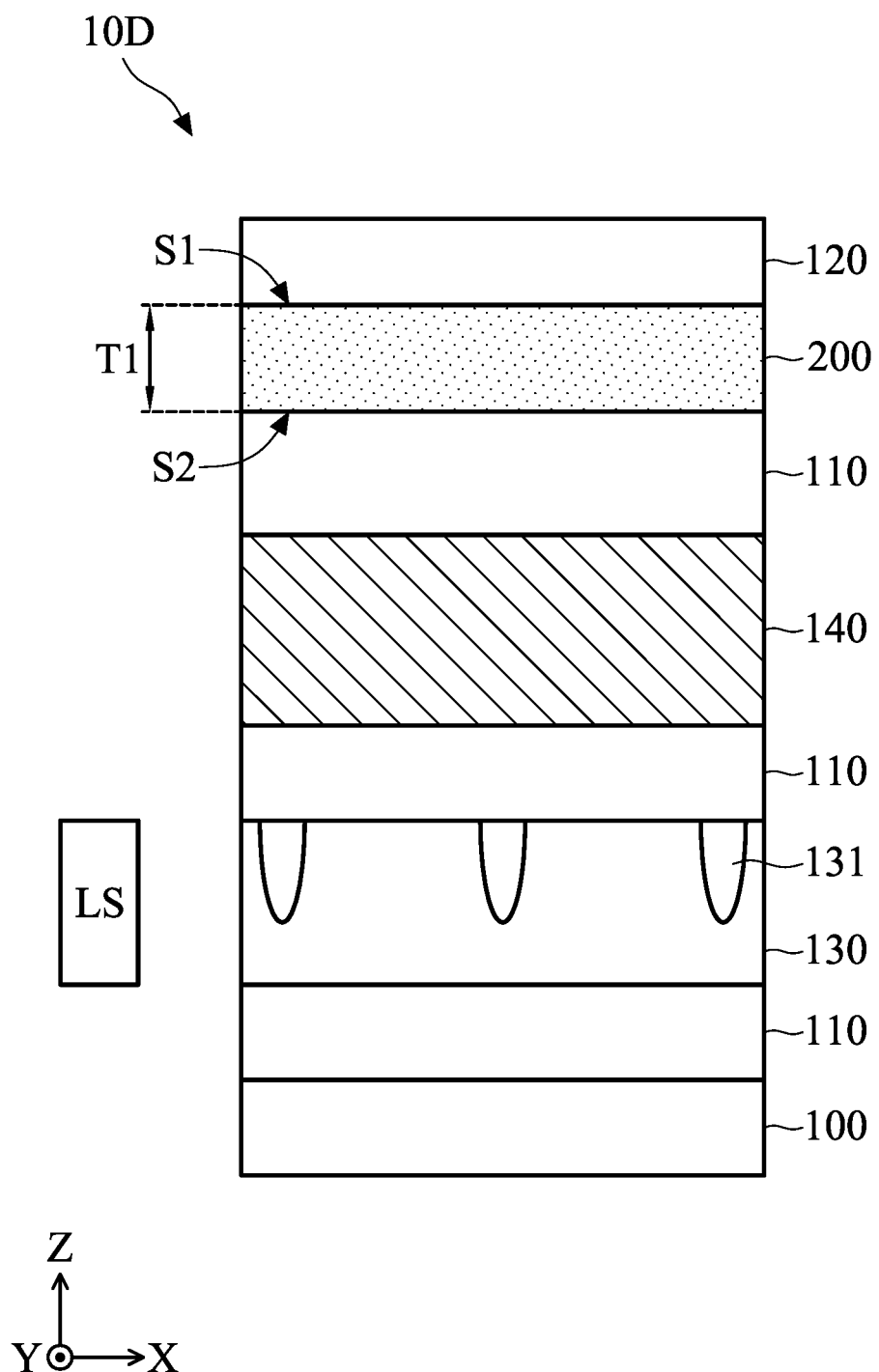

Next, please refer to FIG. 5, which is a cross-sectional diagram of an electronic device 10D in accordance with some other embodiments of the present disclosure. For clarity, some elements of the electronic device 10D may be omitted in the drawings, and only some elements are schematically shown. In accordance with some embodiments, additional features may be added to the electronic device 10D described below.

The electronic device 10D shown in FIG. 5 is substantially the same as the electronic device 10C. Among the differences between them is that the electronic device 10D further includes an anti-reflection layer 120, and the anti-reflection layer 120 is disposed on the first surface S1 of the optical element 200.

Figure 6:
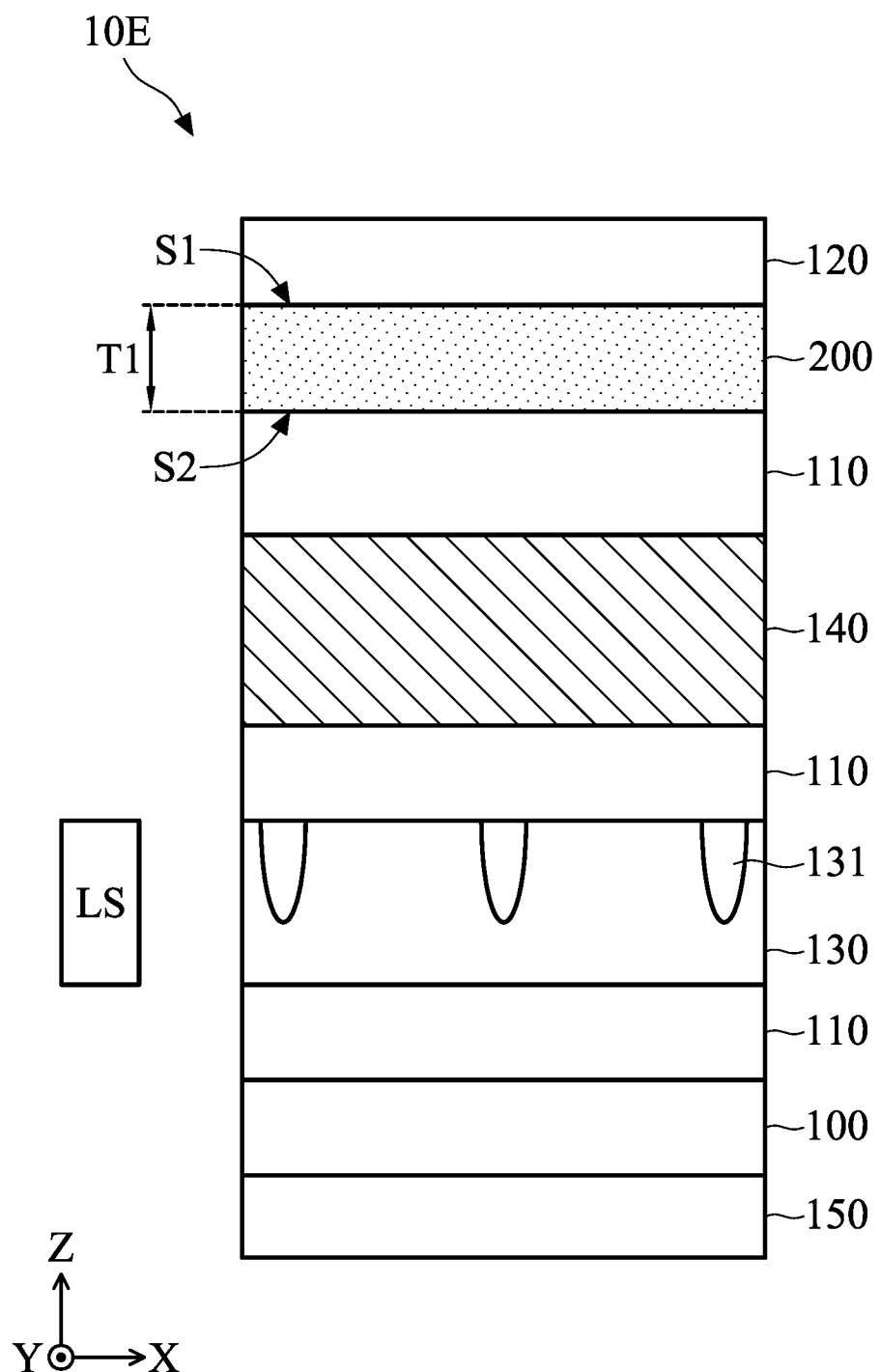

Next, please refer to FIG. 6, which is a cross-sectional diagram of an electronic device 10E in accordance with some other embodiments of the present disclosure. For clarity, some elements of the electronic device 10E may be omitted in the drawings, and only some elements are schematically shown. In accordance with some embodiments, additional features may be added to the electronic device 10E described below.

The electronic device 10E shown in FIG. 6 is substantially the same as the electronic device 10D. Among the differences between them is that the electronic device 10E further includes a detection element 150 (such as a detection input element), and the detection element 150 is disposed on the surface of the panel 100 away from the optical element 200. In accordance with some embodiments, the detection element 150 may be used to detect, for example, a position where an electromagnetic pen, a stylus pen or a laser pen contacts or inputs a signal, but it is not limited thereto.

In accordance with some embodiments, the detection element 150 may include a resistive pressure detection element, an electromagnetic pressure detection element, a capacitive touch detection element or another suitable detection element, but it is not limited thereto. In accordance with some embodiments (not illustrated), the above-mentioned touch element 140 and the detection element 150 can be integrated together, while the touch element 140 and the detection element 150 can be operated separately at different time intervals to reduce signal interference, but it is not limited thereto.

Figure 7:
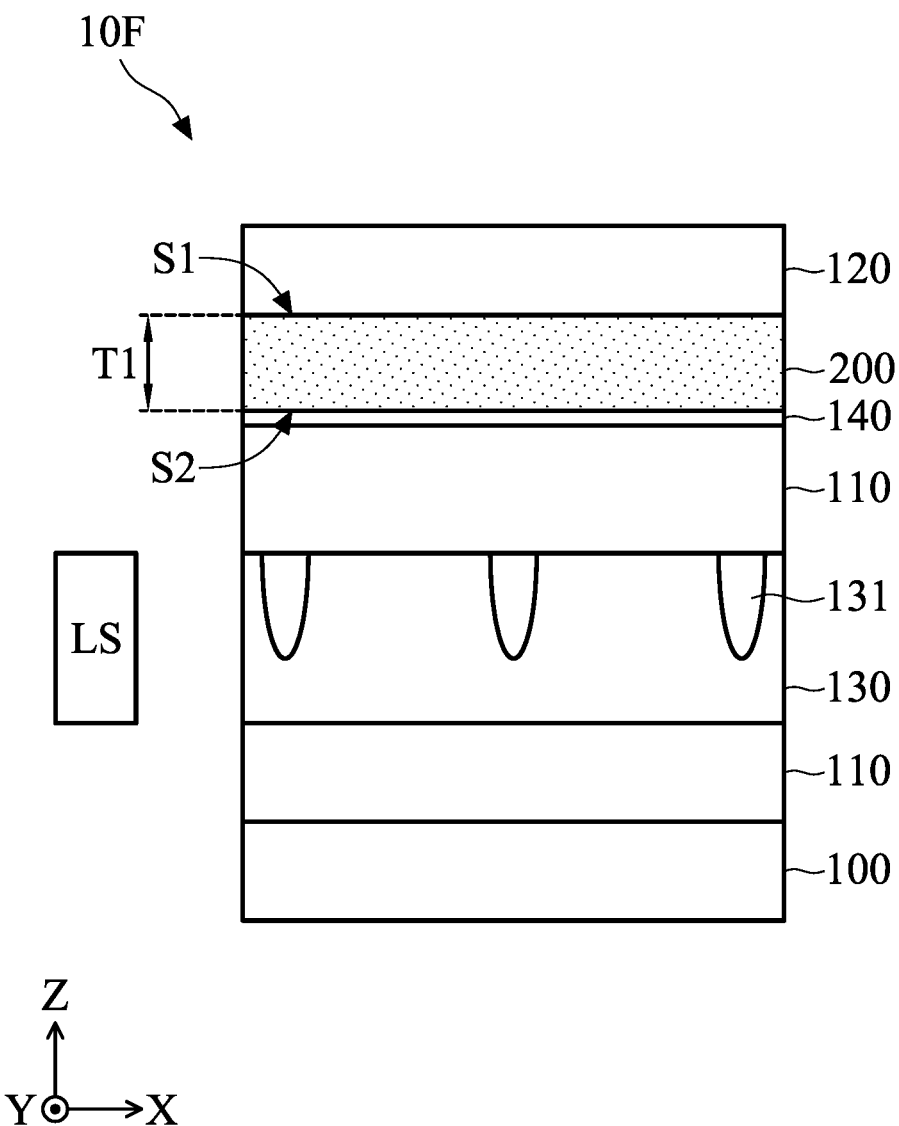

Next, please refer to FIG. 7, which is a cross-sectional diagram of an electronic device 10F in accordance with some other embodiments of the present disclosure. For clarity, some elements of the electronic device 10F may be omitted in the drawings, and only some elements are schematically shown. In accordance with some embodiments, additional features may be added to the electronic device 10F described below.

The electronic device 10F shown in FIG. 7 is substantially the same as the aforementioned electronic device 10A. Among the differences between them is that the electronic device 10F includes a touch element 140, and the touch element 140 is disposed on the first surface S1 or the second surface S2 of the optical element 200. In accordance with some embodiments, the touch element 140 may be disposed on the second surface S2 of the optical element 200, which can reduce the influence of the first surface S1 on the microstructure. Similarly, the touch element 140 may include a touch electrode and the wire electrically connected thereto. In accordance with some embodiments, the materials of the touch electrode and the wire may include a metal material or a transparent conductive material.

In accordance with some embodiments, the electronic device 10F may optionally omit the aforementioned anti-reflection layer 120. That is, the electronic device 10F may include a panel 100, an adhesive layer 110, a light guide plate 130, an adhesive layer 110, a touch element 140 and an optical element 200 disposed in sequence. The electronic device 10F may also include a light source LS disposed adjacent to the light guide plate 130.

Figure 8:
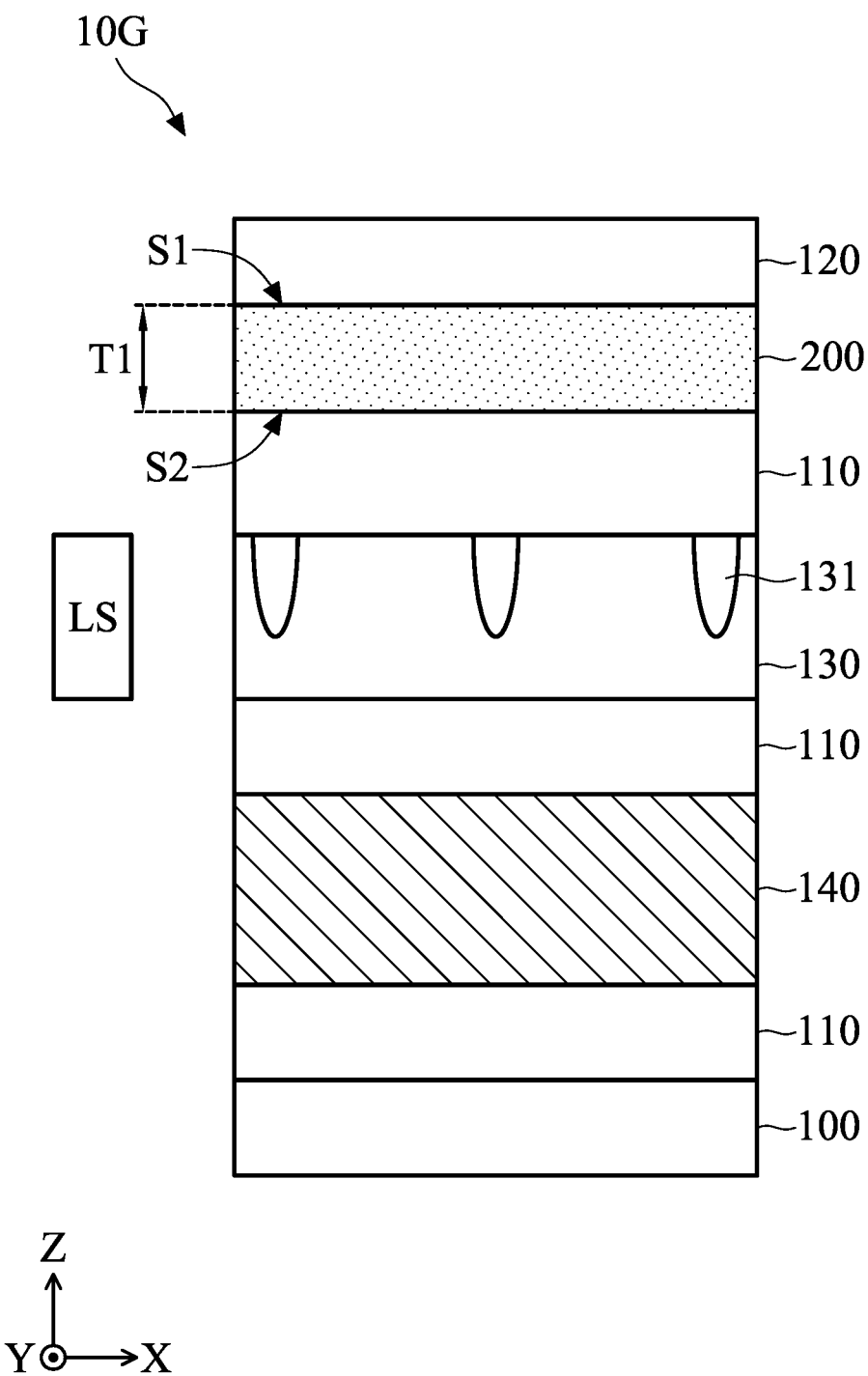

Next, please refer to FIG. 8, which is a cross-sectional diagram of an electronic device 10G in accordance with some other embodiments of the present disclosure. For clarity, some elements of the electronic device 10G may be omitted in the drawings, and only some elements are schematically shown. In accordance with some embodiments, additional features may be added to the electronic device 10G described below.

The electronic device 10G shown in FIG. 8 is substantially the same as the aforementioned electronic device 10D. Among the differences between them is that the positions of the light guide plate 130 and the touch element 140 can be interchanged. That is, the electronic device 10G may include a panel 100, an adhesive layer 110, a touch element 140, an adhesive layer 110, a light guide plate 130, an adhesive layer 110, an optical element 200 and an antireflection layer 120 disposed in sequence. In this embodiment, the touch element 140 is disposed between the panel 100 and the light guide plate 130, and the light guide plate 130 is disposed between the touch element 140 and the optical element 200.

In accordance with some embodiments, the electronic device 10G may optionally omit the aforementioned anti-reflection layer 120. That is, the electronic device 10G may include a panel 100, an adhesive layer 110, a touch element 140, an adhesive layer 110, a light guide plate 130, an adhesive layer 110 and an optical element 200 disposed in sequence.

Figure 9:
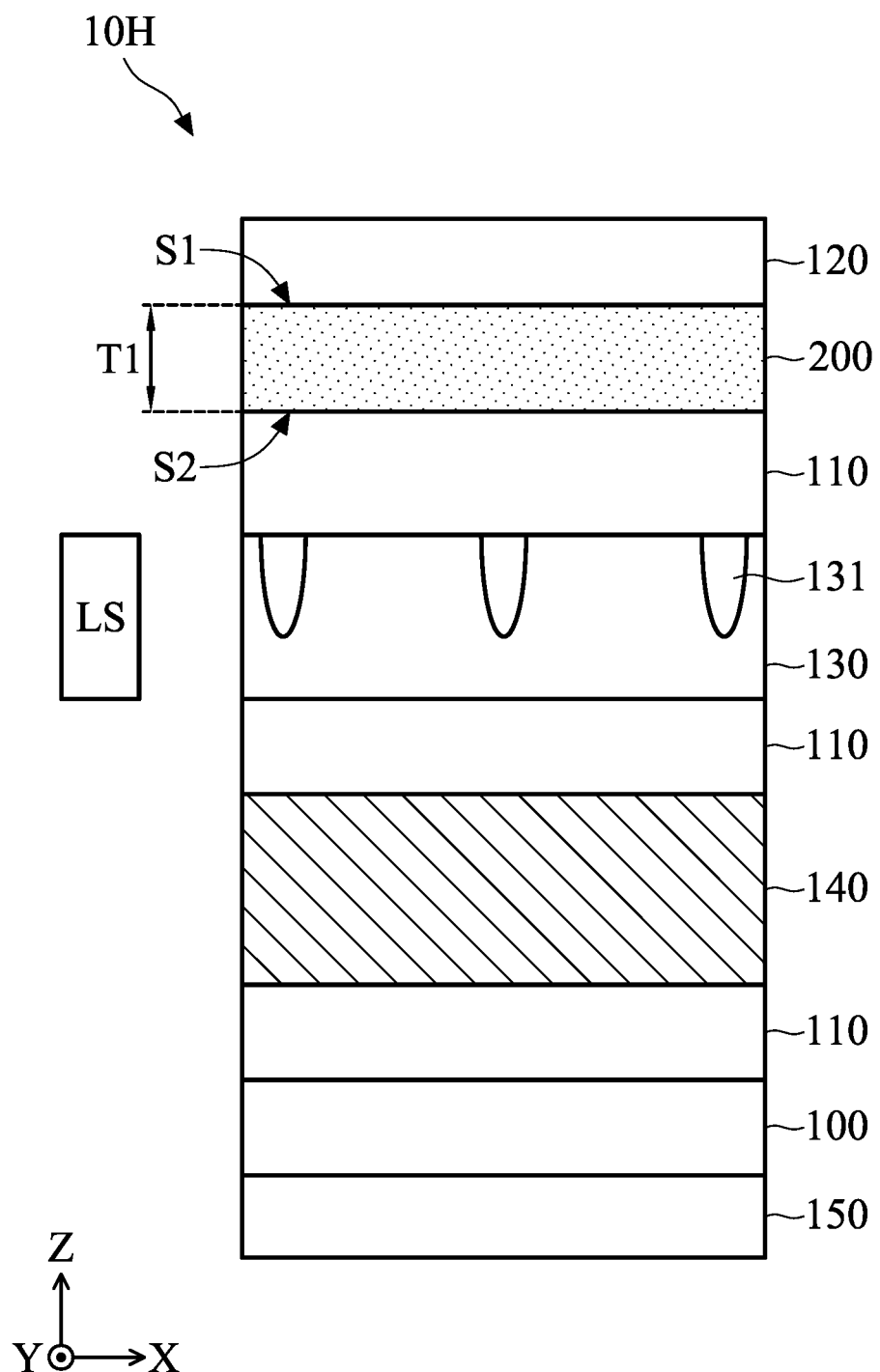

Next, please refer to FIG. 9, which is a cross-sectional diagram of an electronic device 10H in accordance with some other embodiments of the present disclosure. For clarity, some elements of the electronic device 10H may be omitted in the drawings, and only some elements are schematically shown. In accordance with some embodiments, additional features may be added to the electronic device 10H described below.

The electronic device 10H shown in FIG. 9 is substantially the same as the aforementioned electronic device 10G. Among the differences between them is that the electronic device 10H further includes a detection element 150, and the detection element 150 is disposed on the surface of the panel 100 away from the optical element 200. For the detection element 150, reference may be made to the above description.

To summarize the above, in accordance with the embodiments of the present disclosure, the electronic device includes an optical element having a microstructure, and the microstructure has specific structural properties (arithmetical mean deviation of the profile, grain size, glossiness, etc.), thereby improving the anti-glare effect of the optical element. Therefore, the white fog problem of the displayed image can be effectively reduced or the clarity of the displayed image can be improved.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:
a panel; and
an optical element disposed on the panel;
wherein the optical element comprises a first surface away from the panel and a second surface adjacent to the panel, the first surface has a microstructure, the microstructure has an arithmetical mean deviation of the profile (Ra), and the optical element has a thickness, wherein the arithmetical mean deviation of the profile and the thickness conform to the following formula: $0.00001 \leq$ arithmetical mean deviation of the profile/thickness $\leq 0.0104$,
wherein the first surface is opposite to the second surface, wherein the first surface has a first glossiness, the second surface has a second glossiness, and the second glossiness is greater than the first glossiness.

2. The electronic device as claimed in claim 1, wherein the arithmetical mean deviation of the profile and the thickness conform to the following formula: $0.00005 \leq$ arithmetic mean deviation of the profile/thickness $\leq 0.0004$.

3. The electronic device as claimed in claim 1, wherein the arithmetical mean deviation of the profile of the microstructure is between 0.1 micrometers and 0.22 micrometers.

4. The electronic device as claimed in claim 1, wherein the thickness of the optical element is between 21 micrometers and 10000 micrometers.

5. The electronic device as claimed in claim 1, wherein on a plane parallel to the first surface, the microstructure has a width, and the width and the thickness conform to the following formula: $0.001 \leq$ width/thickness $\leq 0.3$.

6. The electronic device as claimed in claim 5, wherein the width of the microstructure and the thickness conform to the following formula: $0.005 \leq$ width/thickness $\leq 0.15$.

7. The electronic device as claimed in claim 5, wherein the width of the microstructure is between 15 micrometers and 50 micrometers.

8. The electronic device as claimed in claim 1, wherein the first glossiness and the second glossiness conform to the following formula: $0.15 \leq$ first glossiness/second glossiness $\leq 0.95$.

9. The electronic device as claimed in claim 8, wherein the first glossiness is between 50 GU and 110 GU.

10. The electronic device as claimed in claim 8, wherein the second glossiness is between 110 GU and 150 GU.

11. The electronic device as claimed in claim 8, wherein the first glossiness and the second glossiness conform to the following formula: 0.2≤ first glossiness/second glossiness≤0.9.

12. The electronic device as claimed in claim 1, further comprising a light guide plate disposed between the optical element and the panel.

13. The electronic device as claimed in claim 12, further comprising a touch element disposed between the optical element and the light guide plate.

14. The electronic device as claimed in claim 1, further comprising a touch element disposed between the optical element and the panel.

15. The electronic device as claimed in claim 1, wherein the panel comprises a plurality of panel units, and the plurality of panel units comprise cholesteric liquid-crystal layers that reflect light of different colors.

16. The electronic device as claimed in claim 1, wherein the electronic device further comprises a touch element disposed on the first surface or the second surface of the optical element.

17. The electronic device as claimed in claim 1, further comprising a detection element disposed on a surface of the panel away from the optical element.

18. The electronic device as claimed in claim 17, wherein the detection element comprises a resistive pressure detection element, an electromagnetic pressure detection element, a capacitive touch detection element, or a combination thereof.

19. The electronic device as claimed in claim 1, further comprising an anti-reflection layer disposed on the first surface.

20. An electronic device, comprising:
a panel;
an optical element disposed on the panel; and
a light guide plate disposed between the optical element and the panel;
wherein the optical element comprises a first surface away from the panel, the first surface has a microstructure, the microstructure has an arithmetical mean deviation of the profile (Ra), and the optical element has a thickness, wherein the arithmetical mean deviation of the profile and the thickness conform to the following formula: 0.00001≤arithmetical mean deviation of the profile/thickness≤0.0104.

21. An electronic device, comprising:
a panel; and
an optical element disposed on the panel;
wherein the optical element comprises a first surface away from the panel, the first surface has a microstructure, the microstructure has an arithmetical mean deviation of the profile (Ra), and the optical element has a thickness, wherein the arithmetical mean deviation of the profile and the thickness conform to the following formula: 0.00001≤arithmetical mean deviation of the profile/thickness≤0.0104,
wherein the panel comprises a plurality of panel units, and the plurality of panel units comprise cholesteric liquid-crystal layers that reflect light of different colors.

* * * * *